United States Patent [19]

Teramae et al.

[11] Patent Number: 5,539,308
[45] Date of Patent: Jul. 23, 1996

[54] DEVICE FOR MEASURING ROTATING SPEED HAVING A RESONENT CIRCUIT AND A REFERENCE CIRCUIT

[75] Inventors: Katsuhiro Teramae, Osaka; Hideki Fukuzono, Nara, both of Japan

[73] Assignee: Matsushita Electric Works, Ltd., Osaka, Japan

[21] Appl. No.: 378,720

[22] Filed: Jan. 26, 1995

[30] Foreign Application Priority Data

Jan. 26, 1994 [JP] Japan .................................. 6-007278
Jul. 26, 1994 [JP] Japan .................................. 6-174100

[51] Int. Cl.$^6$ .............................. G01P 3/56; G01P 3/48
[52] U.S. Cl. .......................... 324/173; 324/161; 327/48; 307/120; 361/242; 361/239
[58] Field of Search .................................. 324/160–163, 324/173, 174–176, 207.22, 207.23, 207.25, 207.26; 377/3, 20; 327/47–49; 340/670–672, 870.31, 941; 307/106, 120; 361/239–242

[56] References Cited

U.S. PATENT DOCUMENTS

| 3,930,201 | 12/1975 | Ackermann et al. | 326/173 |
| 4,574,237 | 3/1986 | Hachtel et al. | 324/173 |
| 4,764,685 | 8/1988 | Bleckmann et al. | 324/160 |

FOREIGN PATENT DOCUMENTS

| 2320941 | 11/1973 | Germany | 324/173 |

*Primary Examiner*—Walter E. Snow
*Assistant Examiner*—Jay M. Patidar
*Attorney, Agent, or Firm*—Armstrong, Westerman, Hattori, McLeland & Naughton

[57] ABSTRACT

A rotary speed measurement device includes an oscillator including a resonant circuit with a coil which conducts a resonant current to develop a magnetic field therearound. A wheel is connected to rotate together with a rotating member and is provided along circumference with alternately arranged first and second marks which causes different magnetic effect on the magnetic field. The coil is disposed adjacent the wheel so as to sense the magnetic effect and provide a corresponding voltage Vs. An analyzer is provided to give a parameter Vsub based upon voltage Vs and to compare the parameter with a predetermined threshold $V_{TH}$ to give a pulse when the parameter exceeds the threshold as indicative of that the wheel rotates by an increment corresponding to an angular distance between the first mark and the adjacent second mark. The pulse is counted by a counter within a unit time to obtain a rotary speed of the wheel. The device is characterized to include a reference circuit connected in circuit with the resonant circuit to provide a reference voltage Vr which is in phase with voltage Vs and varies at a different rate from voltage Vs in response to the inductance change in the coil, and to include a differential low-pass filter which is connected to receive voltage Vs and reference voltage Vr for providing a difference therebetween as the parameter Vsub to be compared at the analyzer with the threshold $V_{TH}$. Thus, voltage difference between Vs and Vr can represent the parameter of which amplitude is kept within a limited range irrespective of the distance between the coil and the wheel, whereby realizing successful rotary speed measurement without necessitating to care the relative position of the rotor to the wheel, and extending the measurable distance between the coil and the wheel.

9 Claims, 13 Drawing Sheets 5,539,308

DEVICE FOR MEASURING ROTATING SPEED HAVING A RESONENT CIRCUIT AND A REFERENCE CIRCUIT

BACKGROUND OF THE INVENTION

1. Field of the Invention

The present invention is directed to a deice for measuring rotary speed of a rotating member, and more particularly to such a rotary speed measuring device employing a sensor coil which develops a magnetic field and which is disposed in the vicinity of a rotating wheel for monitoring an inductance change of the coil caused by regularly appearing marks on the periphery of the wheel, the inductance change being evaluated with a predetermined threshold to give a pulse for giving the rotary speed of the wheel.

2. Description of the Prior Art

U.S. Pat. No. 4,574,237 discloses a prior rotary speed measuring device with the use of a sensor coil conducting an AC current to develop therearound a magnetic field in which a rotating wheel is disposed. The rotating wheel is formed along its circumference with evenly spaced first marks alternated by second marks of different magnetic property from the first marks. As the wheel rotates, the magnetic field of the coil is influenced by successively approaching first and second marks so as to result in a corresponding change in the inductance of the coil. The inductance change of the coil is given in terms of a voltage across the coil, which voltage is then compared with a predetermined threshold to give a pulse indicative of that one first mark is passed by, i.e., the wheel is rotated by one step. A counter is provided to count the pulse within a unit time to give a rotary speed of the wheel. In view of that the voltage developed across the coil (hereinafter referred to as "coil voltage") will decrease as the coil is spaced far from the wheel, the prior art device relying solely upon the coil voltage itself suffers from a restriction that the threshold should vary to a large extend as the distance between the wheel and the coil varies, in order to effect successful comparison between the coil voltage and the threshold. In other words, when the coil is offset from a predetermined standard position, the threshold should be set to a largely different value from a predetermine standard value. Otherwise, it would be possible that the device fail to recognize the rotation of the wheel even if the coil voltage varies in response to the rotary motion of the wheel. This reduce design flexibility and makes it difficult to correctly measure the rotary speed of the wheel, particularly when the coil is spaced far from the wheel.

SUMMARY OF THE INVENTION

The present invention has been achieved in order to reduce the above problem and provides a rotary speed measuring device which is capable of extending a measurable distance between the coil and the wheel without resorting to substantially vary the threshold. The device in accordance with the present invention comprises an oscillator including a resonant circuit with a coil which conducts a resonant current to develop a magnetic field therearound. A wheel is connected to a rotating member to rotate together therewith and is provided its circumference with alternately arranged first and second marks which causes different magnetic effect on the magnetic filed. The coil is disposed in the vicinity of the wheel so as to sense the magnetic effect and provide a corresponding sensor output voltage Vs. An analyzer is provided to give a parameter Vsub based upon the sensed output voltage Vs and to compare the parameter with a predetermined threshold $V_{TH}$ to give a pulse when one of the parameter and the threshold exceeds the other as indicative of that the wheel rotates by an increment corresponding to an angular distance between one of the first marks to the adjacent second mark. The pulse is counted by a counter within a unit time to obtain a rotary speed of the wheel. The device is characterized to include a reference circuit connected in circuit with the resonant circuit to provide a reference voltage Vr which is in phase with the sensed output voltage Vs and varies at a different rate from the sensed output voltage Vs in response to the inductance change in the coil, and to include a differential low-pass filter which is connected to receive the sensed output voltage Vs and the reference voltage Vr for providing a difference therebetween as the parameter Vsub to be compared at the analyzer with the threshold $V_{TH}$. Thus, the difference between the output voltage Vs and the reference voltage Vr can represent the parameter of which amplitude is kept within a limited range irrespective of the distance between the coil and the wheel. In other words, the device can have a consistent dynamic range over the differing distance between the coil and the wheel. Therefore it is readily possible to measure the rotary motion of the wheel by comparison of the parameter with a fixed threshold, which in turn facilitates to extend the measurable distance between the coil and the wheel with the fixed threshold.

Accordingly, it is a primary object of the present invention to provide a rotary speed measuring device which is capable of ensuring successful measurement of the rotary speed without necessitating to care the relative position of the rotor to the wheel, and of extending the measurable distance between the coil and the wheel.

In a preferred embodiment, the resonant circuit is in the form of a bridge composed of the coil connected in series with a resistor, and a series connected pair of capacitors. The series connected pair of the capacitors is connected in parallel with the series combination of the coil and the resistor. A rectifier is connected to a point between the coil and the resistor to give a rectified voltage of an amplitude signal as the sensed output voltage Vs. The resulting output voltage Vs varies by inductance change in the coil dependent upon the speed of the wheel. The oscillator includes a first transistor connected in series with the resonant circuit across a DC voltage source. The reference circuit comprises a series combination of a fixed current source and a second transistor which is connected in parallel with the oscillator. The second transistor is connected to the first transistor to form a current mirror which flows a constant current through the resonant circuit. The reference voltage Vr is given through a rectifier as a rectified voltage of an amplitude signal derived from a connection point between the capacitors of the resonant circuit so as to vary at a rate less than the sensed output voltage Vs in response to the inductance change in said coil. With this arrangement, the difference between the sensed output voltage Vs and the reference voltage Vr can give the parameter which results solely from the change in the sensed output voltage Vs. Therefore, the parameter defines the variation amount itself of the sensed voltage, and not the overall coil voltage, so as to ensure consistent comparison of the parameter with the fixed threshold, which is therefore another object of the present invention.

In another embodiment, the resonant circuit has the same configuration as above and the oscillator includes a transistor connected in series with the resonant circuit across a DC voltage source. The reference circuit comprises a feedback controller which is connected to receive the reference voltage Vr and controls the transistor in a feedback manner in order to keep the reference voltage Vr at a constant level so as to correspondingly vary the sensed output voltage Vs in a direction of enlarging the change in the sensed output voltage, thereby increasing the gain and the dynamic range of the device, which is therefore a further object of the present invention.

Preferably, the analyzer comprises a plurality of comparators having individual thresholds $V_{TH}$ of different values. The comparators are connected to compare the parameter with the individual thresholds $V_{TH}$ such that the pulse is issued when one of the parameter and the threshold exceeds the other at any one of the comparators. With this configuration, it is assured to successfully measure the rotary step of the wheel even if the wheel is eccentric to cause fluctuating magnetic inductance, i.e., fluctuating coil voltage, which is therefore a further object of the present invention.

Moreover, the analyzer is preferred to comprise hysteresis generator which lowers the threshold $V_{TH}$ for the comparator by some extent as one of the parameter Vsub and the threshold of the comparator increases beyond the other and which raises the threshold $V_{TH}$ for the comparator by the same extent at one of the parameter Vsub and the threshold of the comparator lowers below the other. Thus, the parameter can have the hysteresis which avoid erroneous measurement of the wheel rotation resulting from unexpected variation of the coil voltage and therefore assures a reliable speed measurement free from noises, which is therefore a more object of the present invention.

These and still other objects and advantageous features of the present invention will become more apparent from the following detailed description of the embodiments when taken in conjunction with the attached drawings.

DETAILED DESCRIPTION OF THE EMBODIMENTS

Figure 1:
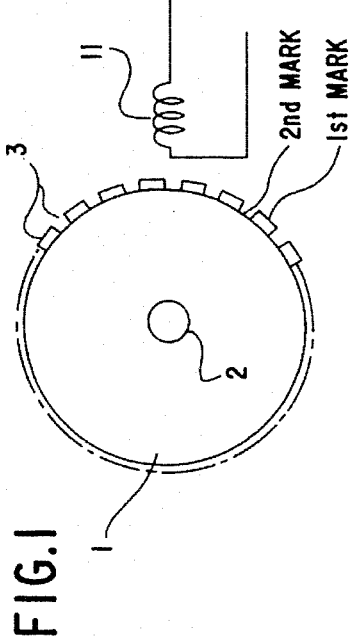
FIG. 1 is a schematic view of a wheel and a coil utilized in a rotary speed measuring device of the present invention.

The rotary speed measuring device of the present invention is adapted in use, for example, as a tachometer for an automobile and utilizes a wheel 1 drivingly connected to a rotating member or axle 2 of the automobile, as shown in FIG. 1. The wheel 1 is of a conventional design having a number of teeth 3 evenly spaced along a circumference of the wheel 1. A coil 11 is disposed in the vicinity of the wheel 1 and conducts an AC current to develop therearound a magnetic field through which the individual teeth 3 of the wheel 1 are passed by as the wheel rotates. Thus, the rotation of the wheel brings about eddy current and magnetic induction effect on the inductance of the coil 11 which is to be sensed for measurement of the rotary speed of the wheel 1. In this respect, the coil 11 acts as a sensor for the wheel.

Figure 2:
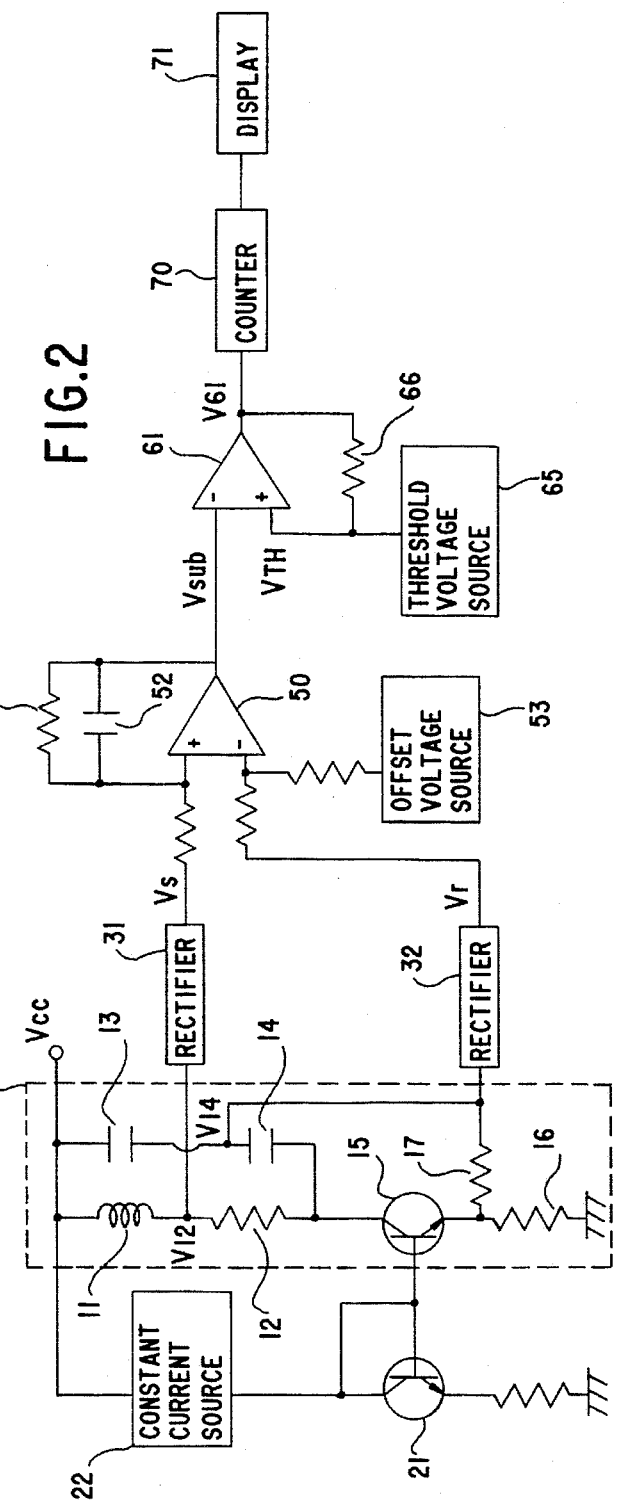
FIG. 2 is a circuit diagram of the rotary speed measuring device in accordance with a first embodiment of the present invention.
Figure 3:
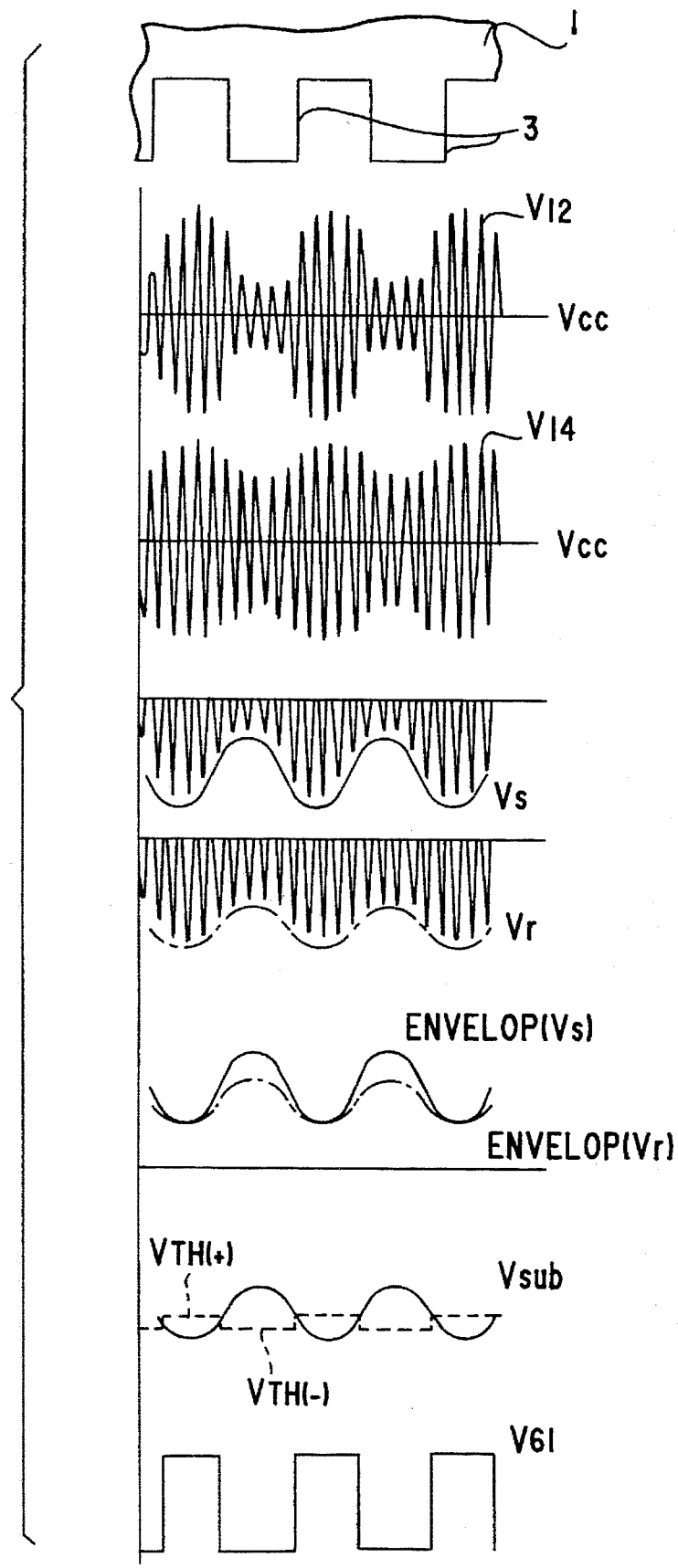
FIG. 3 is a waveform chart illustrating the operation of the above device.

Referring now to FIG. 2, there is shown the device in accordance with a first embodiment of the present invention. The device comprises an oscillator 10 which energizes a resonant circuit including the coil 11. The resonant circuit is in the form of a bridge composed of a series pair of the coil 11 and a resistor 12 and a series pair of capacitors 13 and 14. The oscillator 10 includes a transistor 15 connected in series with the resonant circuit across a voltage source Vcc to supply the electric current for energizing the resonant circuit. Another transistor 21 is connected in series with a constant current source 22 across the voltage source Vcc in such a manner that two transistors 15 and 21 constitutes a current mirror for supplying the constant current through the resonant circuit. A rectifier 31 is connected to a point between the coil 11 and the resistor 12 of the resonant circuit to provide a rectified output voltage Vs which is representative of the coil voltage varying with the change in the coil inductance. Another rectifier 32 is connected to a point between the capacitors 13 and 14 to give a rectified reference voltage Vr which is a divided voltage of that point by resistors 16 and 17. The coil 11, resistor 12, and capacitors 13 and 14 of the bridge are balanced in impedance so as to equal the votlqage Vs and the voltage at the point between capacitors 13 and 14 when there is no change in the magnetic effect due to the wheel. As shown in FIG. 3, each time the tooth 3 of the wheel 1 comes closer to the coil 11, voltage $V_{12}$ at point between coil 11 and resistor 12 reduces in amplitude due to the increasing inductance of the coil 11. At the same time, voltage $V_{14}$ at point between capacitors 13 and resistor 14 reduces also in amplitude but with a less rate than voltage $V_{12}$. These voltages are rectified through rectifiers 31 and 32 followed by being applied to non-inverting input (+) and inverting input (−) of a differential amplifier 50. A parallel circuit of resistor 51 and capacitor 52 is connected between the output of the amplifier 50 and its non-inverting input (+) so that the resulting difference Vsub between the voltage Vs and Vr is provided in the form of a low frequency waveform, i.e., as difference between the envelops (Vs) and (Vr) of the respective voltages Vs and Vr, as shown in FIG. 3. An offset voltage source 53 is connected to the amplifier 50 to give an offset voltage to the resulting output Vsub. The output Vsub is then fed to an inverting input of a comparator 61 where it is compared with a predetermined threshold $V_{TH}$ fed to a non-inverting input (+) of comparator 61 from a threshold voltage source 65. The output of comparator 61 is connected to the non-inverting input of the same through a resistor 66 to give a hysteresis to the threshold $V_{TH}$.

Basically, when voltage Vsub is lower than the threshold $V_{TH}$, the comparator 61 issues a high level output, i.e., a pulse, which is indicative of that the coil 11 faces to a concave between the teeth 3, otherwise the comparator 61 issue a low level output as indicative of that the coil 11 faces to the teeth 3. Consequently, the pulse is issued each time the coil 11 encounters the concave and the one adjacent tooth 3 successively. The number of pulses are counted at a counter 70 with respect to time to give a rotary speed of the wheel 1. The result is fed to a display 71 of the like. The above hysteresis is given in order to eliminate transient voltage fluctuation due to noise or the like for reliable rotary speed measurement. For instance, when voltage Vsub decreases below the threshold $V_{TH}$, the resulting high level output from comparator 61 is additive to the threshold voltage source 65 to raise the threshold to $V_{TH+}$, and when voltage Vsub increases beyond the threshold $V_{TH+}$, the resulting low level output is additive to the threshold voltage source 65 to lower the threshold to $V_{TH-}$, as shown in FIG. 3. It is noted here that due to the bridge configuration of the coil 11, resistor 12, and capacitors 13 and 14, the relative relation between the voltages Vs and Vr is substantially unaffected with the change in the oscillating voltage of the resonant circuit, which reduces a variation in the difference Vsub between the voltage Vs and Vr in the varying oscillating voltage for achieving consistent and reliable speed measurement irrespective of the variation in the source voltage.

Figure 4:
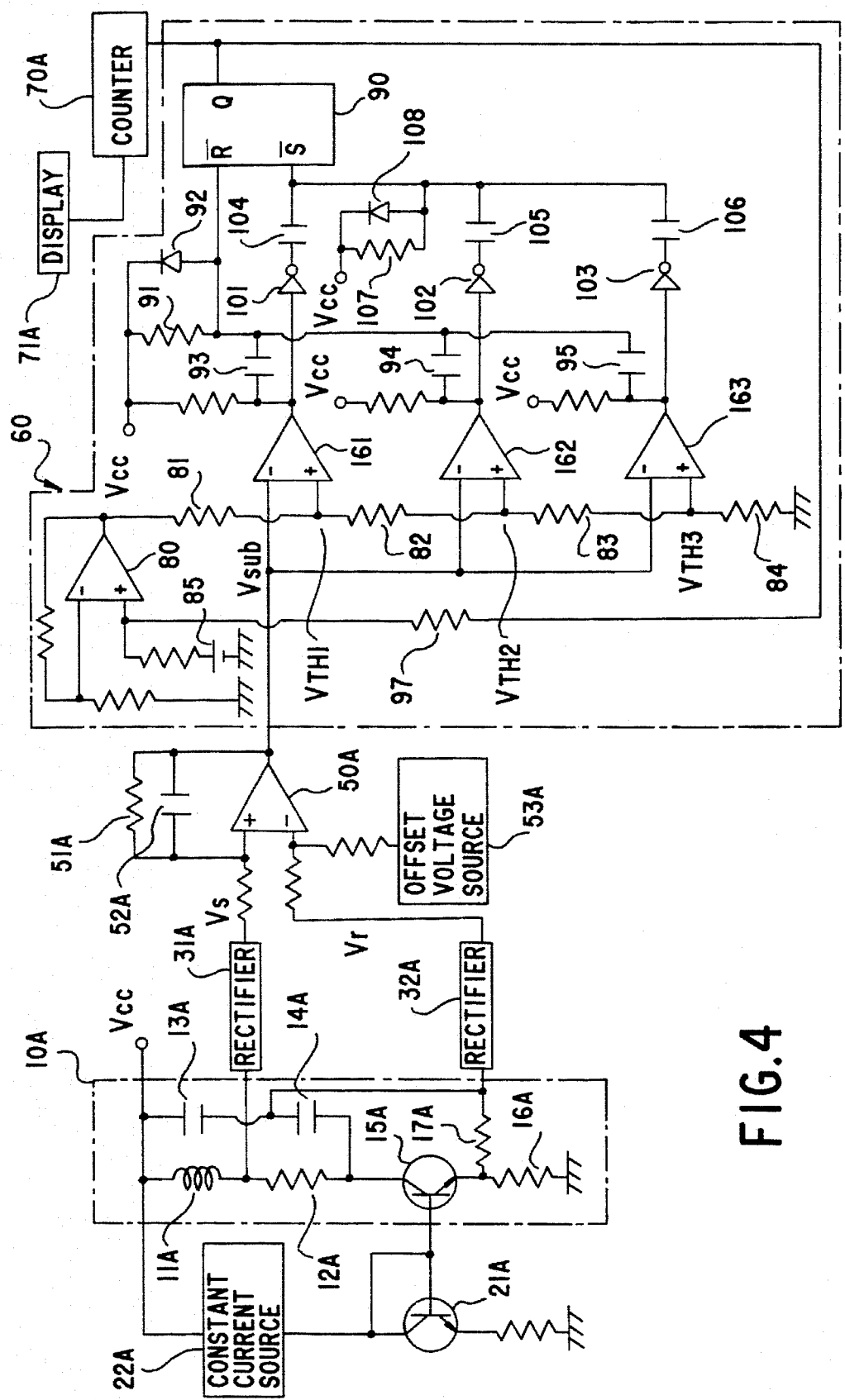
FIG. 4 is a circuit diagram of a modified device of the first embodiment.

FIG. 4 illustrates a modification of the first embodiment, which is identical to the first embodiment except that a more accurate analyzer 60 having a plurality of comparators 161 to 163 is provided instead of a single comparator 61. Like elements are designated by like numerals with a suffix letter of "A" and no duplicate explanation thereof is made here for the sake of simplicity. The output voltage Vsub from the differential amplifier 50A is fed to inverting input of the individual comparators 161 to 163 having different thresholds $V_{TH1}$ to $V_{TH3}$ obtained by dividing output of differential amplifier 80 by a divider network of resistors 81 to 84. The differential amplifier 80 gives the output proportional to the difference between a DC voltage 85 and the ground. The outputs of the comparators 161 to 163 are fed commonly to a reset input $\overline{R}$ of an R-S flip-flop 90 through first differentiators each composed of a common resistor 91, a common diode 92, and corresponding one of capacitors 93 to 95, and the same time fed commonly to a set input $\overline{S}$ of R-S flip-flop 90 through second differentiators each composed of an inverter 101 to 103, capacitor 104 to 106, and common resistor 107 and diode 108. Output Q of flip-flop 90 is fed to a like counter 70A for determination of the rotary speed, and is also fed back to non-inverting input (+) of differential amplifier 80 through a resistor 97 so as to give hysteresis to the individual thresholds $V_{TH1}$ to $V_{TH3}$.

When output voltage Vsub from amplifier 50A exceeds any one of thresholds $V_{TH1}$ to $V_{TH3}$ as a result of that the tooth 3 of the wheel comes close to the coil 11A, the corresponding one of comparators 161 to 162 provides a low-going trigger pulse through the first differentiator to the reset input $\overline{R}$ of an R-S flip-flop 90 so that Q output of flip-flop 90 changes to L-level from H-level at the trailing edge of the low-going the trigger pulse. In response to L-level Q output from flip-flop 90, the voltage supplied to the non-inverting input (+) of the amplifier 80 is lowered to lower its output correspondingly, thereby lowering the thresholds to $V_{TH1-}$ to $V_{TH3-}$ until the output voltage Vsub goes below any one of $V_{TH1-}$ to $V_{TH3-}$. When the voltage Vsub becomes lower than any one of $V_{TH1-}$ to $V_{TH3-}$ as a result of that the concave between teeth 3 of wheel comes close to the coil 11A, the corresponding one of the comparators 161 to 163 responds to provide a H-level output which in turn provides a low-going trigger pulse through the second differentiator to set input $\overline{S}$ of R-S flip-flop 90 so that Q output of flip-flop 90 changes to H-level from L-level. Such Q output is fed as a pulse to the counter 70A for determining the rotary speed of the wheel. At this time, H-level Q output is fed back to the amplifier 80 to raise the output voltage thereof for increasing the value of thresholds to $V_{TH1+}$ to $V_{TH3+}$. Such increased threshold remains until the output voltage $V_{sub}$ goes once again greater than the threshold. In this manner, the thresholds are given hysteresis for reliable measurement of the rotary speed of the wheel.

Figure 5:
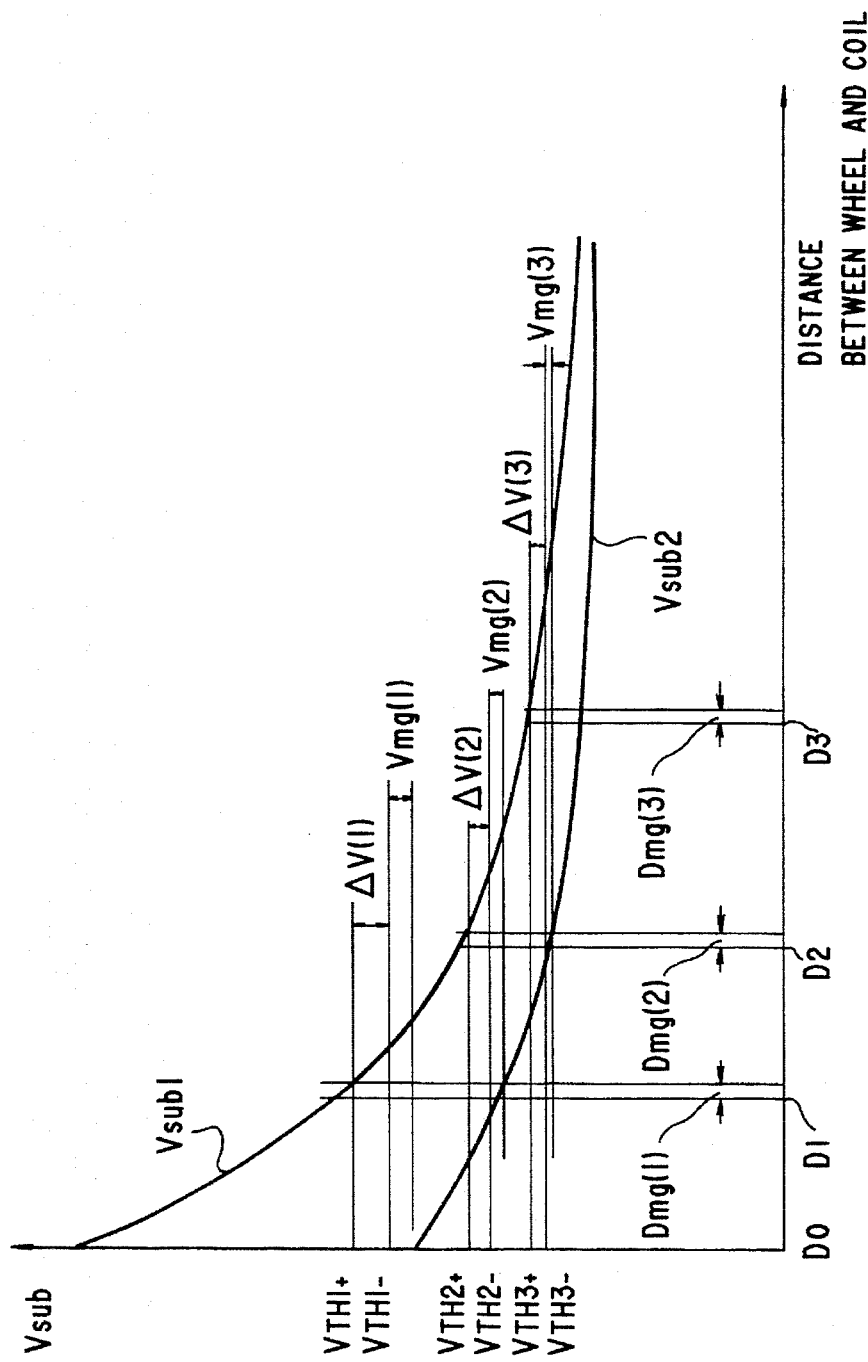
FIGS. 5 to 7 are graphs illustrating the operations of the device of FIG. 4, respectively.

The thresholds $V_{TH1+}$ to $V_{TH3+}$ and $V_{TH1-}$ to $V_{TH3-}$ are set in accordance with a relation as indicated in FIG. 5 in which abscissa represents a distance between the coil and the wheel and ordinate represents output voltage Vsub. In the figure, Vsub1 indicates the output voltage Vsub produced at the time when the tooth of the wheel becomes close to the coil, Vsub2 indicates the output voltage Vsub produced at the time when the concave between the teeth of the wheel comes close to the coil, V(n) indicates hysteresis of the thresholds, Dn indicates a limited of measurable distance in which the corresponding thresholds $V_{THn+}$ and $V_{THn+}$ are effective, Vmg(n) is a margin in relation to an upper limit of Vsub2 within the corresponding measurable range Dn, and Dmg(n) is a margin in relation to the lower limit of Vsub1 for determination of the measurable range Dn.

With the provision of the plural comparators 161 to 163 with different thresholds $V_{TH1}$ to $V_{TH3}$, the speed measurement can be successfully made over an extended distance up to D3, as shown in FIG. 5. That is, the comparator 161 is responsible for speed measurement when the coil 11A is spaced from the wheel by less than D1, the comparator 162 is responsible for the speed measurement when the distance is between D1 and D2, and the comparator 163 is responsible for speed measurement when the distance is between D2 and D3, as seen from the following tables.

Distance between D0 to D1

| Varying Direction of Vsub | ↗ | ↘ | ↗ | ↘ |
|---|---|---|---|---|
| Output of comparator 161 | H | L | H | L |
| Output of comparator 162 | H | H | H | H |
| Output of comparator 163 | H | H | H | H |

Distance between D1 to D2

| Varying Direction of Vsub | ↗ | ↘ | ↗ | ↘ |
|---|---|---|---|---|
| Output of comparator 161 | H | H | H | H |
| Output of comparator 162 | H | L | H | L |
| Output of comparator 163 | H | H | H | H |

Distance between D2 to D3

| Varying Direction of Vsub | ↗ | ↘ | ↗ | ↘ |
|---|---|---|---|---|
| Output of comparator 161 | H | H | H | H |
| Output of comparator 162 | H | H | H | H |
| Output of comparator 163 | H | L | H | L |

Figure 6:
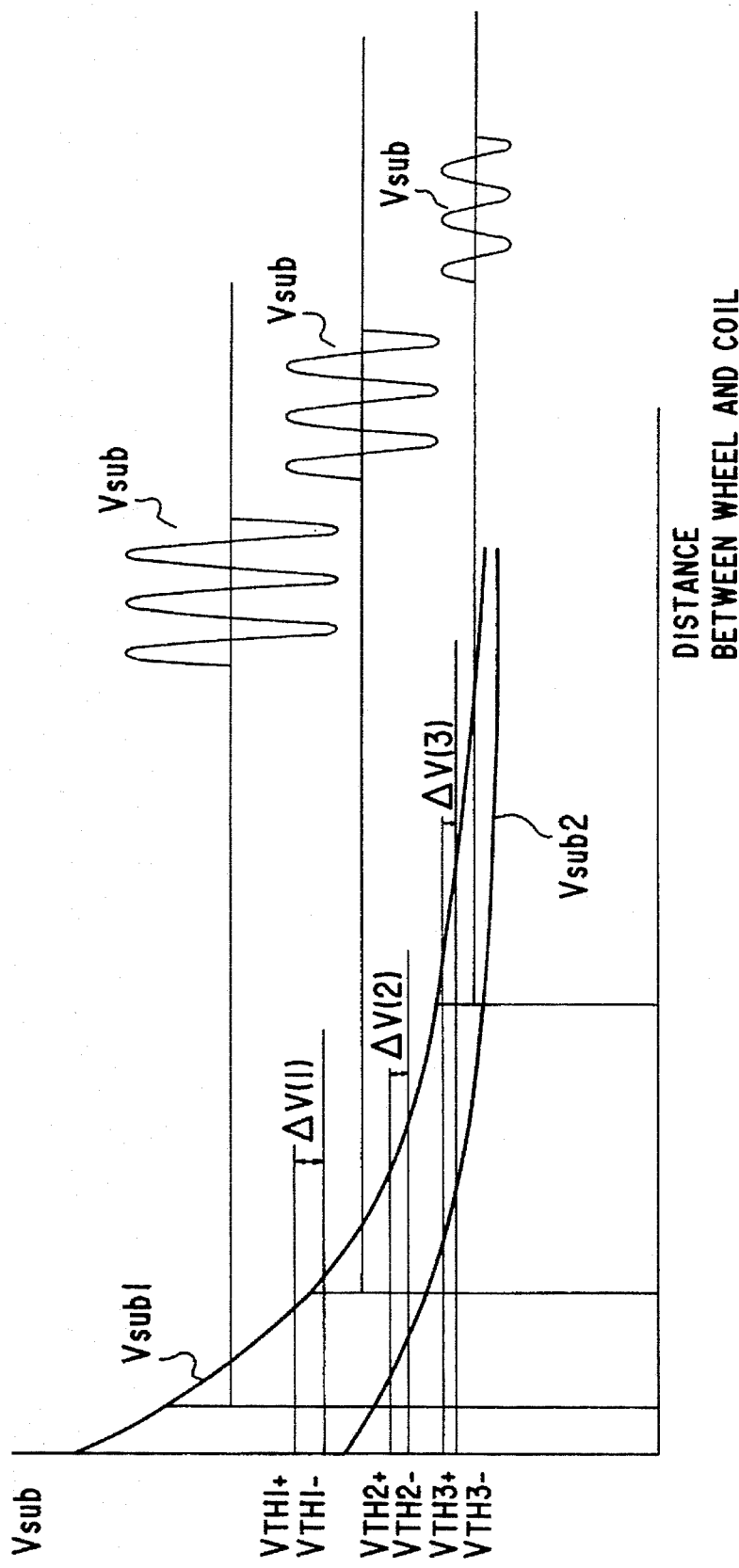

FIG. 6 illustrates the voltage Vsub which will vary to some extent in its amplitude with differing distance between the coil and the wheel. It should be noted here that since the output voltage Vsub is obtained as the difference between the voltage Vs and the reference voltage Vr, the amplitude of voltage Vsub will vary only to a shorter extent as compared to that of the output voltage Vs. This means that each of the distant ranges D0 to D1, D1 to D2, D2 to D3 is made greater yet with a correspondingly fixed threshold than in the case where the output voltage Vs itself, i.e., the absolute value thereof is compared with a suitable threshold.

Figure 7:
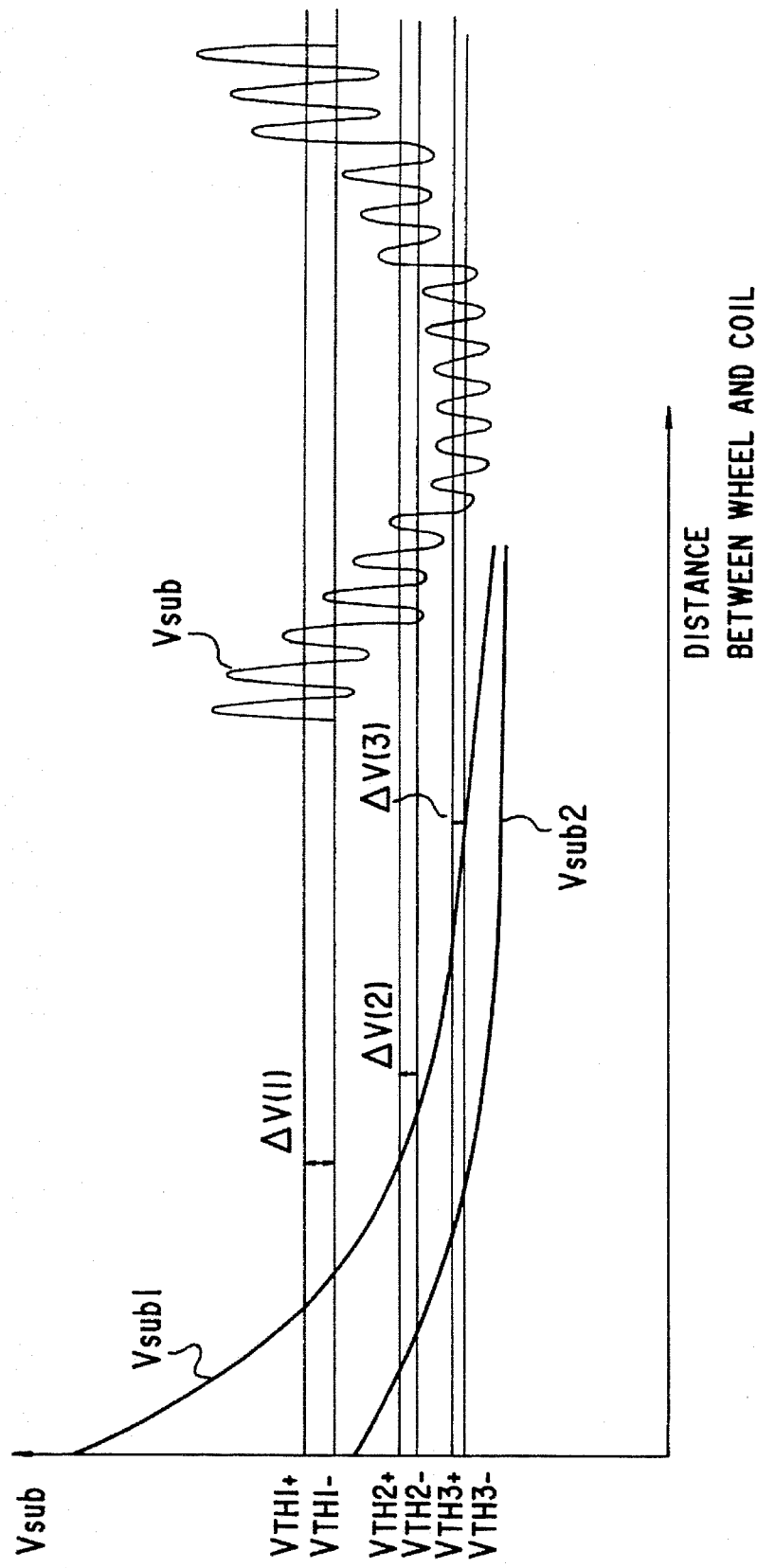

Also with the provision of the plural comparators 161 to 163, it is made successful to effect speed measurement even if the wheel is eccentric to cause wobbling or fluctuation in the resulting voltage Vsub, as indicated by waveform in FIG. 7. That is, even the fluctuation in voltage Vsub will go beyond and below any one of thresholds $V_{TH1}$ to $V_{TH3}$ at the corresponding comparator, as shown in the following table, to give successful speed measurement.

| Varying Direction of Vsub | ↗ | ↘ | ↗ | ↘ | ↗ | ↘ | ↗ | ↘ | ↗ | ↘ | ↗ | ↘ | ↗ | ↘ | ↗ | ↘ | ↗ | ↘ | ↗ | ↘ |
|---|---|---|---|---|---|---|---|---|---|---|---|---|---|---|---|---|---|---|---|---|
| Output of comparator 161 | H | L | H | L | H | L | L | L | L | L | L | L | L | L | L | L | L | L | L | L |
| Output of comparator 162 | H | H | H | H | H | L | H | L | H | L | H | L | L | L | L | L | L | L | L | L |
| Output of comparator 163 | H | H | H | H | H | H | H | H | H | H | H | L | H | L | H | L | H | L | H | L |

Figure 8:
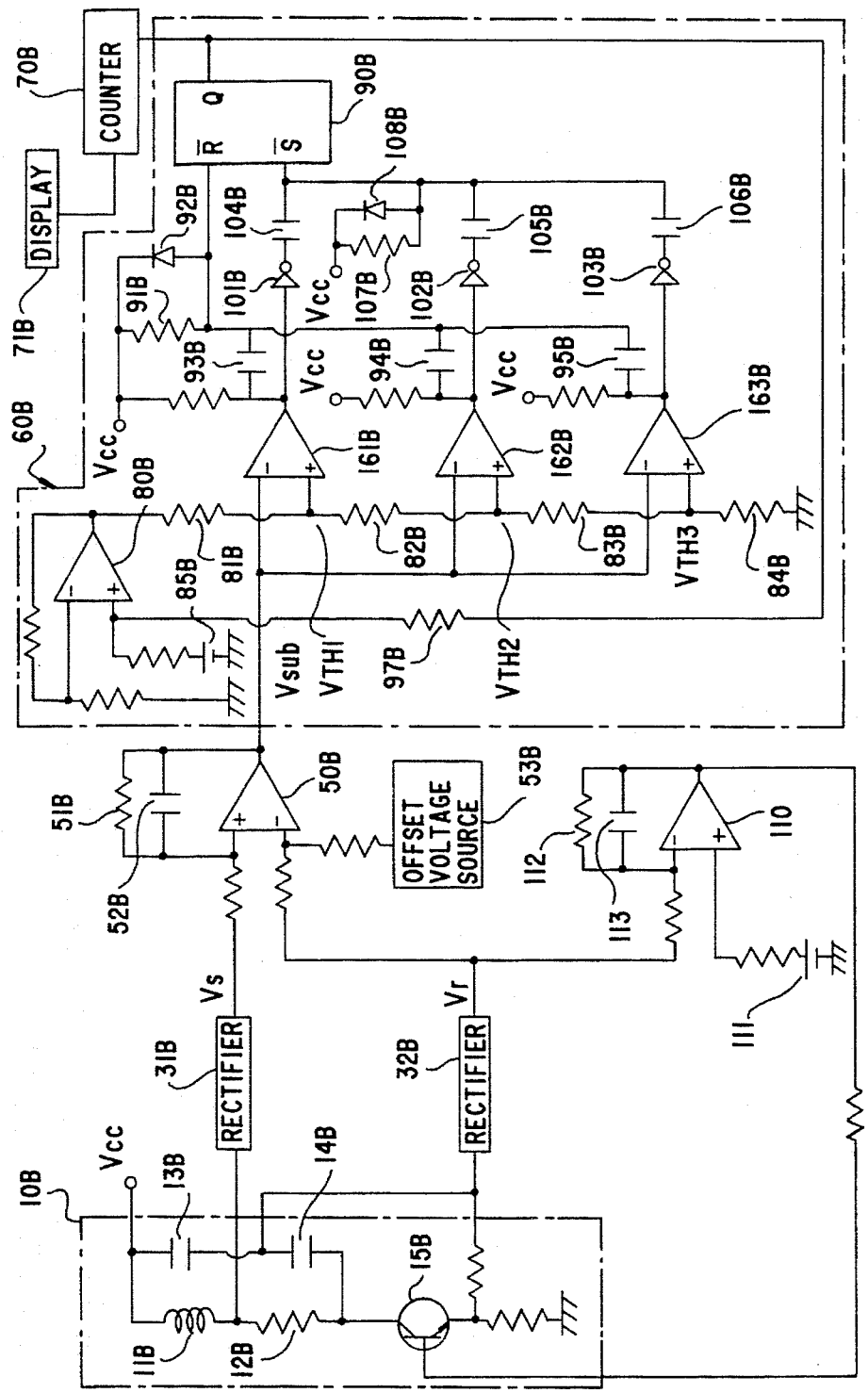
FIG. 8 is a circuit diagram of the device in accordance with a second embodiment of the present invention.

FIG. 8 illustrates a second embodiment of the present invention which is similar to the embodiment of FIG. 4 except that a feedback control is made to magnify the difference between voltage Vs and Vr, i.e., voltage Vsub. The device comprise an oscillator 10B composed of a like resonant bridge circuit of coil 11B, resistor 12B, and capacitors 13B and 14B, and a transistor 15B. A like rectifier 31B is connected to provide a rectified voltage Vs from a connection point between coil 11B and resistor 12B, while a rectifier 32B is connected to provide a rectified voltage Vr from a connection point between capacitors 13B and 14B. Voltage Vr is fed to an inverting input of a like differential amplifier 50B and at the same time to an inverting input of an error amplifier 110 which receives at its non-inverting input a reference voltage from a fixed voltage source 111. A parallel circuit of resistor 112 and capacitor 113 is connected between the output of the amplifier 110 and its inverting input and output is fed back to a base of transistor 15B in order to keep the amplitude of voltage Vr at a constant level. Thus, the resonant circuit sees a constant voltage amplitude to continue providing resonance with an increased difference between votlqage Vs and voltage Vr. The other operations and configurations are identical to the embodiment of FIG. 4. Therefore, like elements are designated by like numerals with a suffix letter of "B" in order to avoid duplicate explanation.

Figure 9:
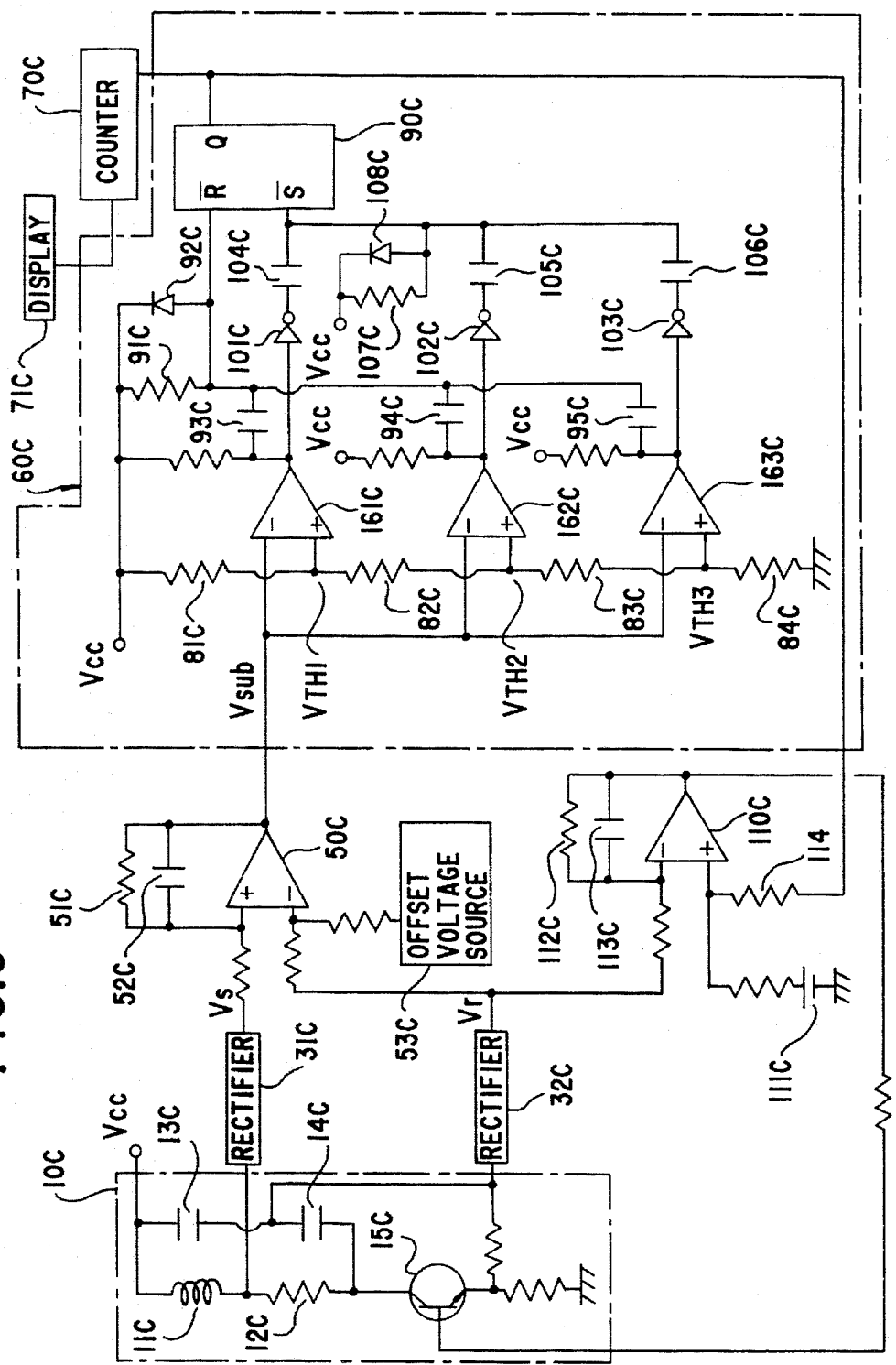
FIG. 9 is a circuit diagram of a modified device of the second embodiment.

FIG. 9 illustrates a modification of the second embodiment which is identical to the second embodiment except for configuration of providing a hysteresis in speed measurement. To this end, an analyzer 60C has a configuration somewhat different from that utilized in the second embodiment in that three comparators 161C to 163C have fixed thresholds which are obtained from a fixed voltage source Vcc through a voltage divider of resistors 81C to 84C. The output of R-S flip-flop 90C is fed back through a resistor 114 to the non-inverting input of the amplifier 110C to switch the reference voltage of the amplifier 110C between high and low voltages. The other configuration is identical to the second embodiment. Therefore, like elements are designated by like numerals with a suffix letter of "C". When flip-flop 90C provides Q output of low level as indicative of that the tooth of the wheel passes by the sensor coil 11C, the reference voltage of the amplifier 110C is switched to the low voltage so as to lower voltage Vr, thereby raising voltage Vsub (Vs–Vr) for enlarging the difference between the voltage Vsub and the fixed thresholds $V_{TH1}$ to $V_{TH3}$. When, on the other hand, flip-flop 90C provides Q output of high level as indicative of that the concave between teeth of the wheel passes by the sensor coil 11C, the reference voltage of amplifier 110 rises to the high voltage as provided from the voltage source 111C so as to correspondingly rise voltage Vr, thereby lowering voltage Vsub (Vs—Vr). In this manner, voltage V sub rises and lowers in a feedback manner in response to the Q output of flip-flop 90C, which means to relatively lowers and rises the thresholds $V_{TH1}$ to $V_{TH3}$ for giving the hysteresis as in the second embodiment.

Figure 10:
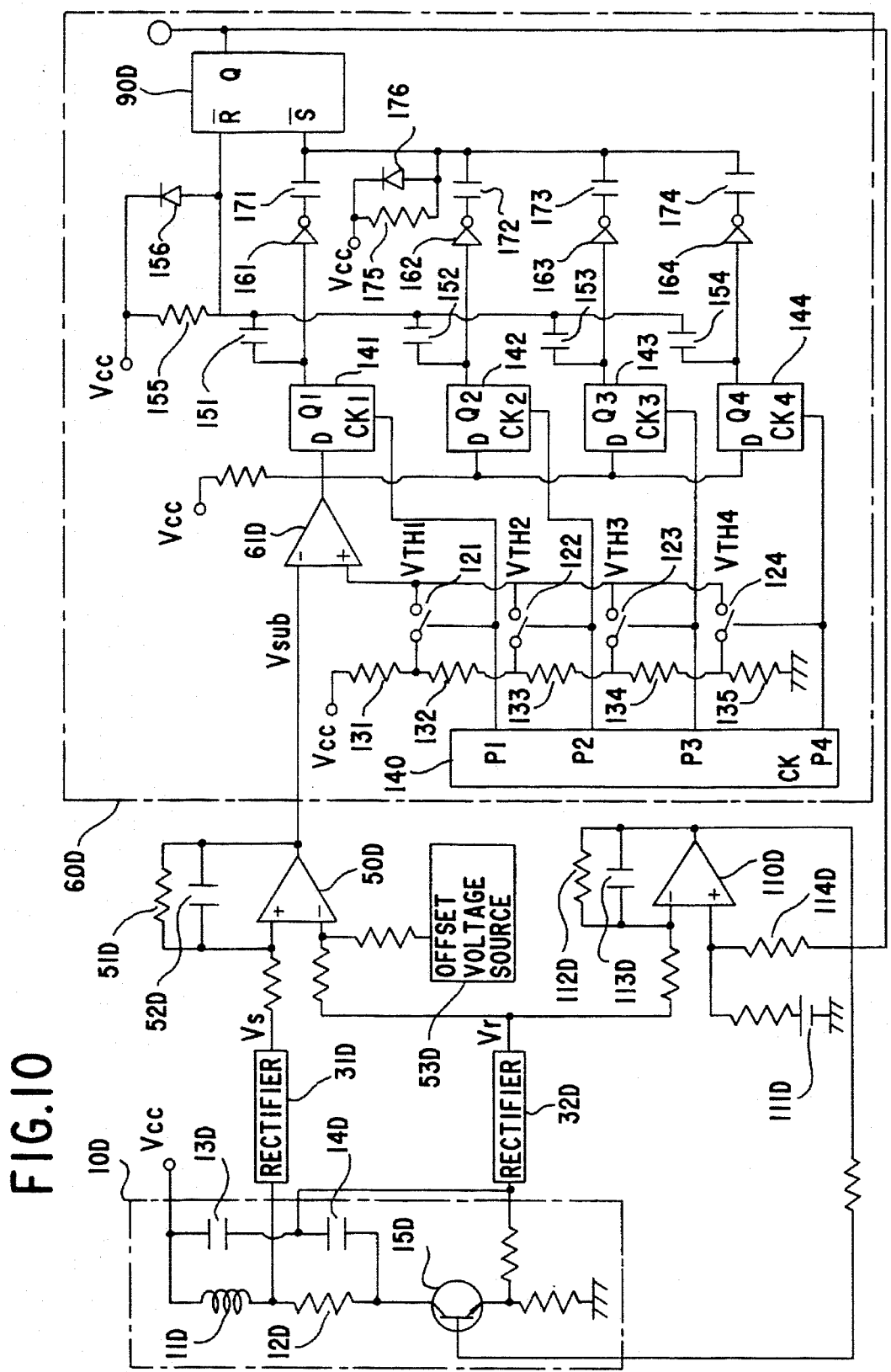
FIG. 10 is a circuit diagram of another modified device of the second embodiment.
Figure 11:
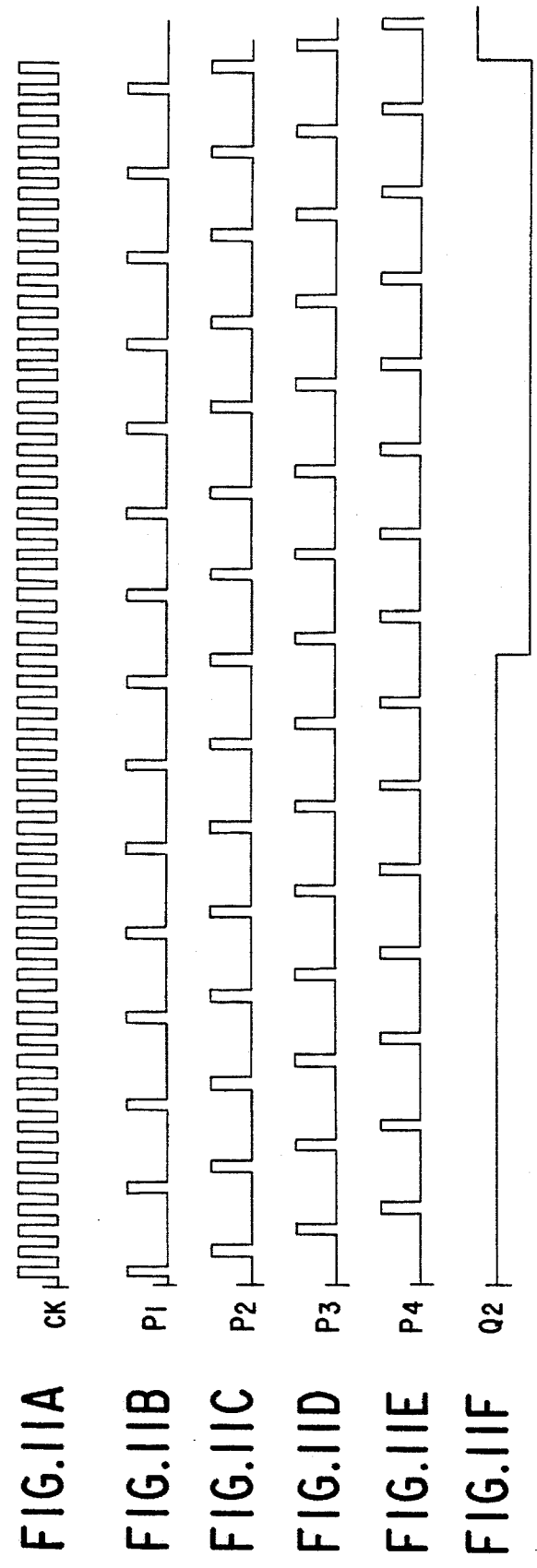
FIG. 11 is a time chart illustrating the operation of the device of FIG. 10.

FIG. 10 illustrates another modification of the second embodiment which is identical to the device of FIG. 9 except that an analyzer 60D of different configuration is provided to recognize the rotary motion of the wheel. Like elements are designated by like numerals with a suffix letter of "D". The analyzer 60D comprises a single comparator 61D which receives voltage Vsub at its inverting input and receives varying threshold $V_{TH1}$ to $V_{TH4}$ at its non-inverting input. The varying threshold $V_{TH1}$ to $V_{TH4}$ is generated selectively by closing one of switches 121 to 124 connected between the non-inverting input of comparator 61D and a voltage divider of resistors 131 and 135 which divide a fixed voltage Vcc by a combination of the resistors. The switches are actuated by a 4-bits counter 140 which generates four separate bit signals from terminals P1 to P4 in a time delayed manner based upon an input clock pulse CK of 8 μs cycle, as shown in FIG. 11. These bit signals are fed to close the associated momentary switches 121 to 124 and fed to clock inputs $CK_1$ to $CK_4$ of D-type flip-flops 141 to 144, respectively. Outputs Q1 to Q4 of flip-flops are connected to reset input $\overline{R}$ of R-S flip-flop 90D through differentiators composed of individual capacitors 151 to 154, a common resistor 155, and a common diode 156, and at the same time connected to set input $\overline{S}$ of R-S flip-flop 90D through differentiators composed of individual inverters 161 to 164, individual capacitors 171 to 174, a common resistor 175, and a common diode 176.

Operation of the device is now discussed with reference to FIGS. 11 and the table below. Comparator 61D compares voltage Vsub with thresholds $V_{TH1}$ to $V_{TH4}$ which are cyclically fed to the non-inverting input of comparator 61D by the action of the counter 140. When voltage Vsub increases beyond any one of the thresholds $V_{TH1}$ to $V_{TH4}$, for example, $V_{TH2}$, comparator 61D provides a low-going pulse to inputs D of flip-flops 141 to 144. Thereafter, upon the corresponding flip-flop 142 receiving the subsequent bit pulse P2 from counter 140, this flop-flop 142 provides the low-going trigger pulse to rest input $\overline{R}$ of R-S flip-flop 90D, thereby changing the Q output of R-S flip-flop 90D from high level to low level by which it is recognized that the single tooth of wheel passes by the sensor coil 11D. When, on the other hand, voltage Vsub decreases below threshold $V_{TH2}$, comparator 61D provides a high level output to flip-flop 142 at a timing of bit pulse P2. Upon occurrence of the subsequent bit pulse P2, flip-flop 142 responds to provide a high-going pulse which is inverted through inverter 162 to give a low-going trigger pulse to set input $\bar{S}$ of R-S flip-flop 90D, thereby changing Q output of flip-flop from low level to high level by which it is recognized that the one concave between the teeth of the wheel passes by the sensor coil 11D. The same operation is equally effected by the other flip-flops in combination of associated bit pulses from the counter 140. In short, as shown in the table below, high-to-low level change of the comparator output actuates R-S flip-flop 90D to give the low level output from the flip-flop, while low-to-high level change of the comparator output actuates R-S flip-flop 90D to give the high level output therefrom, and the level change is made with a delay corresponding to one cycle of the bit pulse.

constant. In this consequence, the current mirror acts to flow a varying current for oscillating the second resonant circuit, thereby generating correspondingly varying reference voltage Vr across the second coil 211. In this manner, the second coil 211 magnetically isolated from the wheel is responsible for providing varying voltage Vr instead of the first coil 11E sensing the wheel rotation. With this parallel combination of the first and second oscillators, temperature compensation can be made for the oscillators to assure reliable speed measurement free from temperature-dependent characteristics of the elements and also from possible source voltage fluctuation and noises. Also with the above feedback control, it is readily possible to magnify the change in magnitude of

| Varying Direction of Vsub | ↗ | ↗ | ↗ | → | → | → | ↘ | ↘ | ↘ | ↘ | ↘ | → | ↗ | ↗ | ↗ |
|---|---|---|---|---|---|---|---|---|---|---|---|---|---|---|---|
| Output of comparator 61D (VTH1) | L | L | L | L | L | L | L | L | L | L | L | L | L | L | L |
| Output of comparator 61D (VTH2) | H | H | H | H | H | H | H | H | H | L | L | L | L | L | H |
| Output of comparator 61D (VTH3) | H | H | H | H | H | H | H | H | H | H | H | H | H | H | H |
| Output of comparator 61D (VTH4) | H | H | H | H | H | H | H | H | H | H | H | H | H | H | H |

The Q output of R-S flip-flop 90D is fed back to error amplifier 110D to give hysteresis in the like manner as discussed in the device of FIG. 9. The other operations and configurations are identical to the device of FIG. 9.

Figure 12:
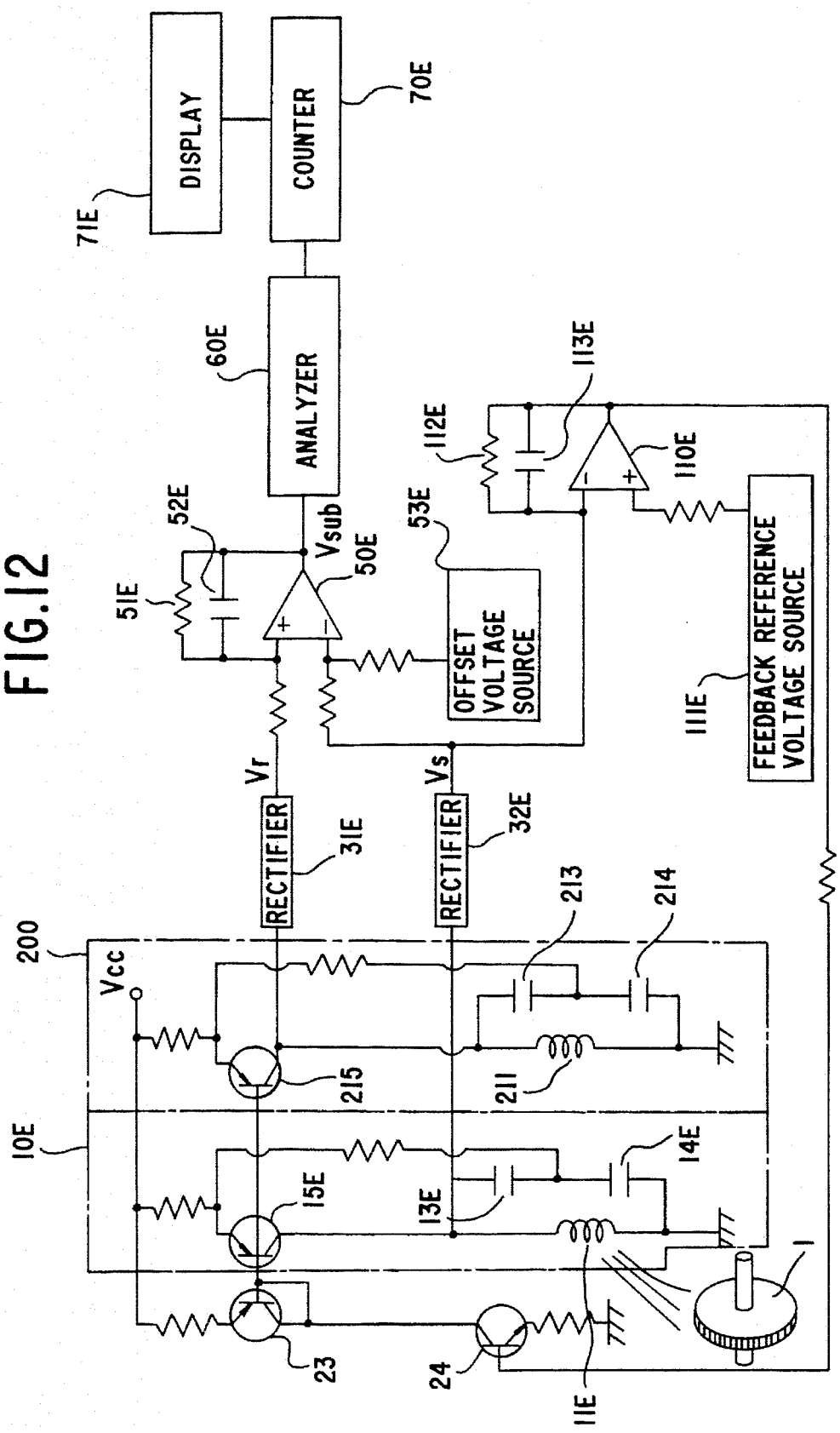
FIG. 12 is a circuit diagram of the device in accordance with a third embodiment of the present invention.

FIG. 12 illustrates a rotary speed measuring device in accordance with a third embodiment of the present invention. The device is identical in configuration and operation to the second embodiment except that a second oscillator 200 including a second resonant circuit is additionally provided in connection with a like oscillator 10E including a first resonant circuit. Like elements and blocks are designated by like numerals with a suffix letter of "E". The first resonant circuit is composed of a like sensor coil 11E, and a series pair of capacitors 13E and 14E connected across the coil 11E. A first transistor 15E is connected in series with the first resonant circuit across the voltage source Vcc. The second resonant circuit is composed of a second coil 211 and a series pair of capacitors 213 and 214 connected across the coil 211. A second transistor 215 is connected in series with the second resonant circuit also across the voltage source Vcc. A third transistor 23 is connected in series with a current regulating transistor 24 across the voltage source Vcc in such a manner that three transistors 15E, 23, and 215 constitutes a current mirror for supplying the constant current through the first and second resonant circuits. The first coil 11E is disposed in the vicinity of the wheel, while the second coil 211 is magnetically isolated form the first coil 11E as well as from the wheel. The second resonant circuit is configured to have the same resonant frequency as the first resonant circuit under a condition that the magnetic filed generated by the first coil is not disturbed by the wheel. A first rectifier 31E is connected to receive a voltage across the first coil 11E to give a rectified sensed voltage Vs which would vary with the change in the coil inductance in the absence of a feedback control as will be discussed later. A second rectifier 32E is connected to receive a voltage across the second coil 211 to give a rectified reference voltage Vr fed to non-inverting input of comparator 50E. Voltage Vs is fed to inverting input of a like comparator 50E and at the same time to an inverting input of a like error amplifier 110E. Output of error amplifier 110E is fed back to the current regulating transistor 24 in order to keep voltage Vs voltage Vr, i.e., enlarging voltage Vsub for more reliable and consistent recognition of the wheel rotation. It is noted that when the second coil 211 is configured to sense the distance between the coil and the wheel rather than sensing the movement of the tooth, the resulting voltage Vr can have a difference from voltage Vs, which difference results substantially solely from the wheel circumference, thereby assuring more consistent speed measurement practically independently of the distance between the wheel and the sensor coil 11E. For this purpose, the second coil 211 is preferred to be of less directivity than the first coil 11E. The operations of the analyzer 60E and the subsequent sections may be made in any of the aforementioned manner. Therefore, no duplicate explanation hereof is made herein. It is noted, however, that output of the analyzer 60E is utilized to give hysteresis for recognition of the wheel rotation step in the manner as described in the embodiments of FIGS. 2, 4, or 9.

Figure 13:
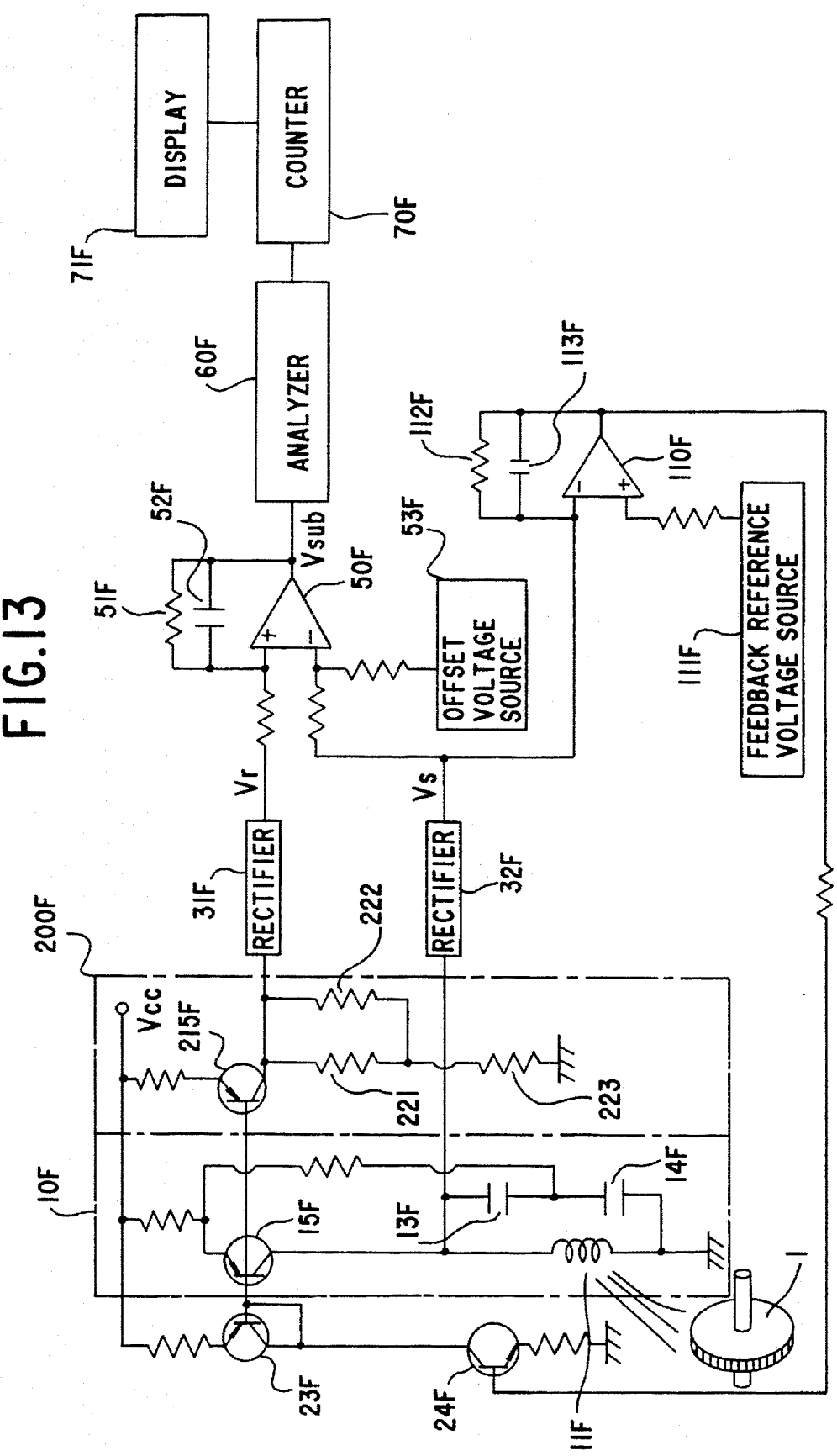
FIG. 13 is a circuit diagram of a modification of the third embodiment.

FIG. 13 illustrates a modified device which is identical in configuration and operation to the third embodiment of FIG. 12 except that a network of resistors 221 to 223 is utilized instead of the second resonant circuit of FIG. 12. Like elements are designated by like numerals with a suffix letter of "F". In this modification, the second rectifier 32F provides reference voltage Vr from a connection between the second transistor 215F and resistor 221. Voltage Vr is caused to oscillate as a consequence of that the current mirror gives a varying collector current to the second transistor 215F in response to the feedback control of keeping voltage Vs constant, in the same manner as in the third embodiment. With this result, voltage Vr and therefore voltage Vsub (=Vr−Vs) gives an effective parameter for determination of the wheel rotation, as in the previous embodiments. With the use of the resistor network in series with the second transistor 215F, it is possible to select a suitable resistance without being restricted from the oscillation of the resonant circuit. Resistors 222 and 223 are added to give suitable combination resistance for effecting temperature compensation of the circuit.

Figure 14:
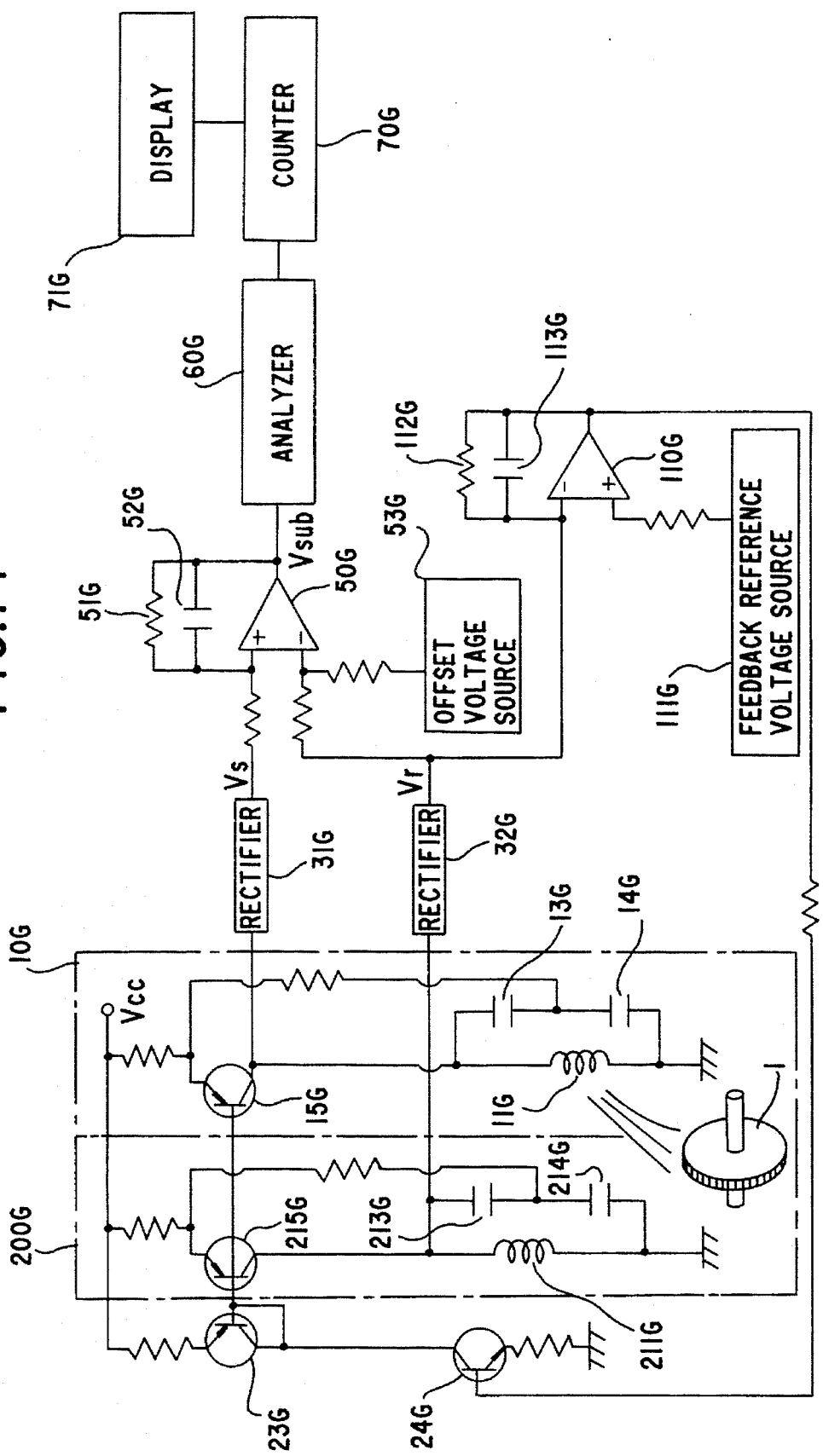
FIG. 14 is a circuit diagram of the device in accordance with a fourth embodiment of the present invention.

FIG. 14 illustrates a rotary speed measuring device in accordance with a fourth embodiment of the present invention. The device is identical in configuration to the third embodiment except that voltage Vr from the second rectifier 32G is kept constant by a like feedback control loop including a like error amplifier 110G, while the first coil 11G of the first oscillator 10G is responsible to give varying voltage Vs through the first rectifier 31G. Like elements and blocks are designated by like numerals with a suffix letter of "G". The first coil 11G is disposed in the vicinity of the wheel for sensing the rotary motion thereof, while the second coil 211G is magnetically isolated from the wheel as well as from the first coil 11G. A differential amplifier 50G is connected to provide voltage Vsub which is subsequently processed in the manner as described in any one of the previous embodiments. Also in this modification with the parallel combination of the first and second oscillators, temperature compensation can be made for the oscillators to assure reliable speed measurement free from temperature-dependent characteristics of the elements and also from possible source voltage fluctuation and noises.

What is claimed is:

1. A device for measuring rotary speed of a rotating member which comprises:

an oscillator including a resonant circuit with a coil which conducts a resonant current to develop a magnetic field therearound;

a wheel connected to said rotating member to rotate together therewith, said wheel provided along its circumference with alternately arranged first and second marks which have different magnetic properties, said coil disposed in the vicinity of said wheel so as to sense said magnetic effect and provide a corresponding sensor output voltage;

analyzing means which gives a parameter based upon said sensed output voltage and compares said parameter with a predetermined threshold to give a pulse when said parameter exceeds said threshold as indicative of that said wheel rotates by an increment corresponding to an angular distance between one of said first marks to the adjacent second mark; and a counter which counts said pulse within a unit time to obtain a rotary speed of said wheel;

wherein said device comprises a reference circuit connected in circuit with said resonant circuit to provide a reference voltage which is in phase with said sensed output voltage and varies at a different rate from said sensed output voltage in response to the inductance change in said coil, and a differential low-pass filter is connected to receive said sensed output voltage and said reference voltage for providing an analogue value which is a difference therebetween as said parameter to be compared at said analyzing means with said threshold.

2. A device as set forth in claim 1, wherein said resonant circuit comprises a bridge composed of said coil connected in series with a resistor, and a series connected pair of capacitors, said series combination of said capacitors being in parallel with said series combination of said coil and said resistor, said sensed output voltage being derived as a rectified voltage of an amplitude signal from a connection point between said coil and said resistor in said resonant circuit so as to vary by inductance change in said coil dependent upon the speed of said wheel;

wherein said oscillator comprises a first transistor connected in series with said resonant circuit across a DC voltage source, and wherein said reference circuit comprises a series combination of a fixed current source and a second transistor which is connected in parallel with said oscillator, said second transistor connected to said first transistor to form a current mirror to flow a constant current through said resonant circuit, said reference voltage being as a rectified voltage of an amplitude signal derived from a connection point between said capacitors in said resonant circuit so as to vary at a rate less than said sensed output voltage in response to said inductance change in said coil.

3. A device as set forth in claim 1, wherein said resonant circuit comprises said coil connected in series with a resistor, and a series connected pair of capacitors, said series combination of said capacitors being in parallel with said series combination of said coil and said resistor, said sensed output voltage being derived as a rectified voltage of an amplitude signal from a connection point between said coil and said resistor in said resonant circuit so as to vary by inductance change in said coil dependent upon the speed of said wheel;

wherein said oscillator comprises a transistor connected in series with said resonant circuit across a DC voltage source, and wherein said reference circuit comprises a feedback controller connected to receive said reference voltage which is a rectified voltage of an amplitude signal from a connection point between said capacitors in said resonant circuit, said feedback controller controlling said transistor in a feedback manner in order to keep said reference voltage at a constant level.

4. A device as set forth in claim 1, wherein said oscillator comprises a first transistor connected in series with said resonant circuit across a voltage source, said sensed output voltage being derived as a rectified voltage of an amplitude signal developed across said coil so as to vary by inductance change in said coil dependent upon the speed of said wheel; and wherein said reference circuit comprises;

a second oscillator comprising a second transistor connected in series with a second resonant circuit including a second coil and oscillating at substantially the same resonant frequency as said resonant circuit, said second coil providing thereacross an amplitude signal which is rectified to give said reference voltage Vr;

a variable current source comprising a series connected pair of a current regulating transistor and a third transistor in parallel with said oscillator; and a feedback controller connected to receive said sensed output voltage;

said third transistor connected to said first and second transistors to form a current mirror for providing to said resonant circuit and said second resonant circuit a constant current determined by said variable current source, said feedback controller controlling said current regulating transistor to vary the current flowing through said variable current source for giving a constant current through said resonant circuit and through said second resonant circuit in such a manner at to keep said sensed output voltage at a constant level, such that varying said reference voltage instead of said sensed output voltage in response to said inductance change of said coil dependent upon the speed of said wheel, said second coil being magnetically isolated from said wheel such that said reference voltage varies substantially solely by the current flowing through said current mirror to represent the inductance change of said coil in said resonant circuit.

5. A device as set forth in claim 1, wherein said oscillator comprises a first transistor connected in series with said resonant circuit across a voltage source, said sensed output voltage being derived as a rectified voltage of an amplitude signal developed across said coil to vary by inductance change in said coil dependent upon the speed of said wheel; and wherein said reference circuit comprises:

a second transistor connected in series with a resistor across said voltage source, said reference voltage being derived as a rectified voltage of an amplitude signal from a connection point between said second transistor and said resistor;

a variable current source comprising a series connected pair of a current regulating transistor and a third transistor in parallel with said oscillator; and a feedback controller connected to receive said sensed output voltage;

said third transistor connected to said first and second transistors to form a current mirror for providing to said resonant circuit and the series combination of said second transistor and said resistor a constant current determined by said variable current source, said feedback controller controlling said current regulating transistor to vary the current flowing through said variable current source for giving a constant current through said resonant circuit and through said second transistor in such a manner as to keep said sensed output voltage at a constant level such that varying said reference voltage instead of said sensed output voltage.

6. A device as set forth in claim 1, wherein said oscillator comprises a first transistor connected in series with said resonant current across a voltage source, said sensed output voltage being derived as a rectified voltage of an amplitude signal developed across said coil so as to vary by inductance change in said coil dependent upon the speed of said wheel; and wherein said reference circuit comprises:

a second oscillator comprising a second transistor connected in series with a second resonant circuit including a second coil and oscillating at substantially the same resonant frequency as said resonant circuit;

a variable current source comprising a series connected pair of a current regulating transistor and a third transistor in parallel with said oscillator; and a feedback controller connected to receive said reference voltage which is derived as a rectified voltage of an amplitude signal developed across said second coil;

said third transistor connected to said first and second transistors to form a current mirror for providing to said resonant circuit and said second resonant circuit a constant current determined by said variable current source, said feedback controller controlling said current regulating transistor to vary the current flowing through said variable current source for giving a constant current through said resonant circuit and through said second resonant circuit in such a manner as to keep said reference voltage at a constant level, said second coil being magnetically isolated from said wheel such that said sensed output voltage varies in response to the inductance change of said coil in said resonant circuit as well as the current flowing through said current mirror.

7. A device as set forth in claim 1, wherein said analyzing means comprises a plurality of comparators having individual thresholds of different values, said comparators being connected to compare said parameter with said individual thresholds such that said analyzing means issues said pulse when said parameter exceeds threshold at any one of said comparators.

8. A device as set forth in claim 7, wherein said analyzing means comprises a hysteresis means which lowers said threshold for each comparator by some extent as said parameter and the threshold of said each comparator increases beyond the other and which raises said threshold for each comparator by the same extent as one of said parameter and the threshold of said each comparator lowers below the other.

9. A device as set forth in claim 1, wherein said analyzing means comprises a single comparator receiving said parameter at its one input and means for applying different thresholds cyclically to the other input of said comparator so that said comparator compares said parameter with said varying thresholds with respect to time, said analyzing means issues said pulse when said parameter exceeds said threshold.

* * * * *

UNITED STATES PATENT AND TRADEMARK OFFICE
CERTIFICATE OF CORRECTION

PATENT NO.:   5,539,308
DATED     :   July 23, 1996
INVENTOR(S):  Katsuhiro TERAMAE et al It is certified that error appears in the above-identified patent and that said Letters Patent is hereby corrected as shown below:

Title page, Item [54], change "RESONENT" TO --RESONANT--.

Signed and Sealed this

Thirty-first Day of December, 1996

Attest:

BRUCE LEHMAN

Attesting Officer          Commissioner of Patents and Trademarks